US010305537B2

(12) United States Patent
Fan et al.

(10) Patent No.: US 10,305,537 B2
(45) Date of Patent: May 28, 2019

(54) PHASE SYNCHRONIZATION FOR RECIPROCITY-BASED COMP JOINT TRANSMISSION WITH UE FEEDBACK OF BOTH CO-PHASING AND SLOPE

(71) Applicant: QUALCOMM Incorporated, San Diego, CA (US)

(72) Inventors: Zhifei Fan, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/975,480

(22) Filed: May 9, 2018

(65) Prior Publication Data

US 2018/0375545 A1 Dec. 27, 2018

Related U.S. Application Data

(60) Provisional application No. 62/524,279, filed on Jun. 23, 2017.

(51) Int. Cl.
*H04L 7/06* (2006.01)
*H04B 1/7075* (2011.01)
(Continued)

(52) U.S. Cl.
CPC .............. *H04B 1/7075* (2013.01); *H04L 7/06* (2013.01); *H04L 27/2655* (2013.01); *H04W 56/0015* (2013.01)

(58) Field of Classification Search
USPC .................................. 375/326, 232, 150, 359
See application file for complete search history.

(56) References Cited

U.S. PATENT DOCUMENTS

2007/0070877 A1* 3/2007 Sun ..................... H04L 25/0206
370/208
2008/0207138 A1* 8/2008 Aoki ..................... H03L 7/0812
455/75

(Continued)

FOREIGN PATENT DOCUMENTS

EP 2154802 A1 2/2010
WO WO-2013068840 A1 5/2013

OTHER PUBLICATIONS

International Search Report and Written Opinion—PCT/US2018/032001—ISA/EPO—Aug. 21, 2018.

*Primary Examiner* — Eva Y Puente
(74) *Attorney, Agent, or Firm* — Liem T. Do

(57) ABSTRACT

Over-the-air phase synchronization for reciprocity-based coordinated multipoint (CoMP) joint transmission is discussed. The base stations of the CoMP group and served user equipment (UEs) transmit phase synchronization reference signals (PSRS). The receiving nodes compute wideband co-phasing values representing the phase difference between pairs of the PSRS over each tone of a whole spectrum band, and slope values based on the per-tone co-phasing values. The UEs feedback the wideband downlink co-phasing value and the downlink slope value. The base stations of the CoMP group determine a phase compensation based on the differences between the slope value calculated by the base station and the slope value reported by the UE, and based on the differences between the wideband co-phasing value calculated by the base station and the wideband co-phasing value reported by the UE. The base station uses the phase compensation to adjust communications by the base stations in the CoMP group.

22 Claims, 10 Drawing Sheets

(51) Int. Cl.
    *H04L 27/26*     (2006.01)
    *H04W 56/00*     (2009.01)

(56) References Cited

U.S. PATENT DOCUMENTS

| | | | |
|---|---|---|---|
| 2013/0029586 A1 | 1/2013 | Wang | |
| 2013/0083780 A1 | 4/2013 | Luo et al. | |
| 2014/0185662 A1* | 7/2014 | Azizi | H04L 27/2647 |
| | | | 375/232 |
| 2015/0117499 A1* | 4/2015 | Chae | H04B 1/7085 |
| | | | 375/150 |
| 2018/0367150 A1* | 12/2018 | Kushnir | H03L 7/00 |
| 2019/0007055 A1* | 1/2019 | Nelson | H03L 7/093 |
| 2019/0007189 A1* | 1/2019 | Hossain | H03L 7/235 |

\* cited by examiner

PHASE SYNCHRONIZATION FOR RECIPROCITY-BASED COMP JOINT TRANSMISSION WITH UE FEEDBACK OF BOTH CO-PHASING AND SLOPE

CROSS-REFERENCE TO RELATED APPLICATIONS

This application claims the benefit of U.S. Provisional Patent Application No. 62/524,279, entitled, "PHASE SYNCHRONIZATION FOR RECIPROCITY-BASED CoMP JOINT TRANSMISSION WITH UE FEEDBACK OF BOTH CO-PHASING AND SLOPE," filed on Jun. 23, 2017, which is expressly incorporated by reference herein in its entirety.

BACKGROUND

Field

Aspects of the present disclosure relate generally to wireless communication systems, and more particularly, to over-the-air phase synchronization for reciprocity-based coordinated multipoint (CoMP) joint transmission.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a base station of a plurality of base stations in a CoMP group serving one or snore served UEs, a feedback report from the one or more served UEs, wherein the feedback report includes: a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and a downlink slope value for the whole spectrum band based on the downlink co-phasing values for each of the plurality of tones over the whole spectrum band. The method also includes computing, at the base station, a per-tone uplink co-phasing value for each tone of the plurality of tones over the whole spectrum band based on an uplink PSRS as received by the pair of base stations; computing, at the base station, an uplink slope value for the whole spectrum band based on the computed per-tone uplink co-phasing values for each tone of the plurality of tones; determining, at the base station, a timing difference between the pair of base stations based on a difference between the uplink slope value and the downlink slope value; computing, by the base station, a wideband uplink co-phasing value based on the per-tone uplink co-phasing values for each tone of the plurality of tones and the timing difference; and applying, by the base station, a phase correction value to communications by the plurality of base stations in the CoMP group, wherein the phase correction value is based on the timing difference and the difference between the wideband uplink co-phasing value and the wideband downlink co-phasing value.

In another aspect, a method of wireless communication includes transmitting, by a UE, an uplink PSRS to one or more base stations, wherein the one or more base stations are part of a plurality of base stations in a CoMP group serving the LTE. The method also includes receiving, at the UE, a downlink PSRS from each of the plurality of base stations in the CoMP group; and determining, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pair. The method further includes computing a downlink slope value for the whole spectrum band based on the downlink co-phasing values between each pair of the plurality of base stations over each tone of a plurality of tones of the whole spectrum band; and reporting, by the UE, the wideband downlink co-phasing value and the downlink slope value.

In a further aspect, a computer program product comprises a non-transitory computer-readable medium having instructions recorded thereon that, when executed by one or more computer processors, cause the one or more computer processors to carry out operations. For example, the operations include receiving, at a base station of a plurality of base stations in a CoMP group serving one or more served UEs, a feedback report from the one or more served UEs, wherein the feedback report includes: a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and a downlink slope value for the whole spectrum band based on the downlink co-phasing values for each of the plurality of tones over the whole spectrum band. The operations also include computing, at the base station, a per-tone uplink co-phasing value for each tone of the plurality of tones over the whole spectrum band based on an uplink PSRS as received by the pair of base stations; computing, at the base station, an uplink slope value for the whole spectrum band based on the computed per-tone uplink co-phasing values for each tone of the plurality of tones; determining, at the base station, a timing difference between the pair of base stations based on a difference between the uplink slope value and the downlink slope value; computing, by the base station, a wideband uplink co-phasing value based on the per-tone uplink co-phasing values for each tone of the plurality of tones and the timing difference; and applying, by the base station, a phase correction value to communications by the plurality of base stations in the CoMP group, wherein the phase correction value is based on the timing difference and the difference between the wideband uplink co-phasing value and the wideband downlink co-phasing value.

In yet a further aspect, a computer program product comprises a non-transitory computer-readable medium having instructions recorded thereon that, when executed by one or more computer processors, cause the one or more computer processors to carry out operations. For example, the operations include transmitting, by a UE, an uplink PSRS to one or more base stations, wherein the one or more base stations are part of a plurality of base stations in a CoMP group serving the UE. The operations also include receiving, at the UE, a downlink PSRS from each of the plurality of base stations in the CoMP group; and determining, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pair. The operations further include computing a downlink slope value for the whole spectrum band based on the downlink co-phasing values between each pair of the plurality of base stations over each tone of a plurality of tones of the whole spectrum band; and reporting, by the UE, the wideband downlink co-phasing value and the downlink slope value.

In yet another aspect, an apparatus includes means for receiving, at a base station of a plurality of base stations in a CoMP group serving one or more served UEs, a feedback report from the one or more served UEs, wherein the feedback report includes: a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and a downlink slope value for the whole spectrum band based on the downlink co-phasing values for each of the plurality of tones over the whole spectrum band. The apparatus also includes means for computing, at the base station, a per-tone uplink co-phasing value for each tone of the plurality of tones over the whole spectrum band based on an uplink PSRS as received by the pair of base stations; means for computing, at the base station, an uplink slope value for the whole spectrum band based on the computed per-tone uplink co-phasing values for each tone of the plurality of tones; means for determining, at the base station, a timing difference between the pair of base stations based on a difference between the uplink slope value and the downlink slope value; means for computing, by the base station, a wideband uplink co-phasing value based on the per-tone uplink co-phasing values for each tone of the plurality of tones and the timing difference; and means for applying, by the base station, a phase correction value to communications by the plurality of base stations in the CoMP group, wherein the phase correction value is based on the timing difference and the difference between the wideband uplink co-phasing value and the wideband downlink co-phasing value.

In another aspect, an apparatus includes means for transmitting, by a UE, an uplink PSRS to one or more base stations, wherein the one or more base stations are part of a plurality of base stations in a CoMP group serving the UE. The apparatus also includes means for receiving, at the UE, a downlink PSRS from each of the plurality of base stations in the CoMP group; and means for determining, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pair. The apparatus further includes means for computing a downlink slope value for the whole spectrum band based on the downlink co-phasing values between each pair of the plurality of base stations over each tone of a plurality of tones of the whole spectrum band; and means for reporting, by the UE, the wideband downlink co-phasing value and the downlink slope value.

In yet another aspect, a transmitter apparatus includes computer readable memory and a processor configured to receive, at a base station of a plurality of base stations in a CoMP group serving one or more served UEs, a feedback report from the one or more served UEs, wherein the feedback report includes: a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and a downlink slope value for the whole spectrum band based on the downlink co-phasing values for each of the plurality of tones over the whole spectrum band. The processor is also configured to compute, at the base station, a per-tone uplink co-phasing value for each tone of the plurality of tones over the whole spectrum band based on an uplink PSRS as received by the pair of base stations; compute, at the base station, an uplink slope value for the whole spectrum band based on the computed per-tone uplink co-phasing values for each tone of the plurality of tones; determine, at the base station, a timing difference between the pair of base stations based on a difference between the uplink slope value and the downlink slope value; compute, by the base station, a wideband uplink co-phasing value based on the per-tone uplink co-phasing values for each tone of the plurality of tones and the timing difference; and apply, by the base station, a phase correction value to communications by the plurality of base stations in the CoMP group, wherein the phase correction value is based on the timing difference and the difference between the wideband uplink co-phasing value and the wideband downlink co-phasing value.

In yet another aspect, a transmitter apparatus includes computer readable memory and a processor configured to transmit, by a UE, an uplink PSRS to one or more base stations, wherein the one or more base stations are part of a plurality of base stations in a CoMP group serving the UE. The processor is also configured to receive, at the UE, a downlink PSRS from each of the plurality of base stations in the CoMP group; and determine, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pain. The processor is further configured to compute a downlink slope value for the whole spectrum band based on the downlink co-phasing values between each pair of the plurality of base stations over each tone of a plurality of tones of the whole spectrum band; and report, by the UE, the wideband downlink co-phasing value and the downlink slope value.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
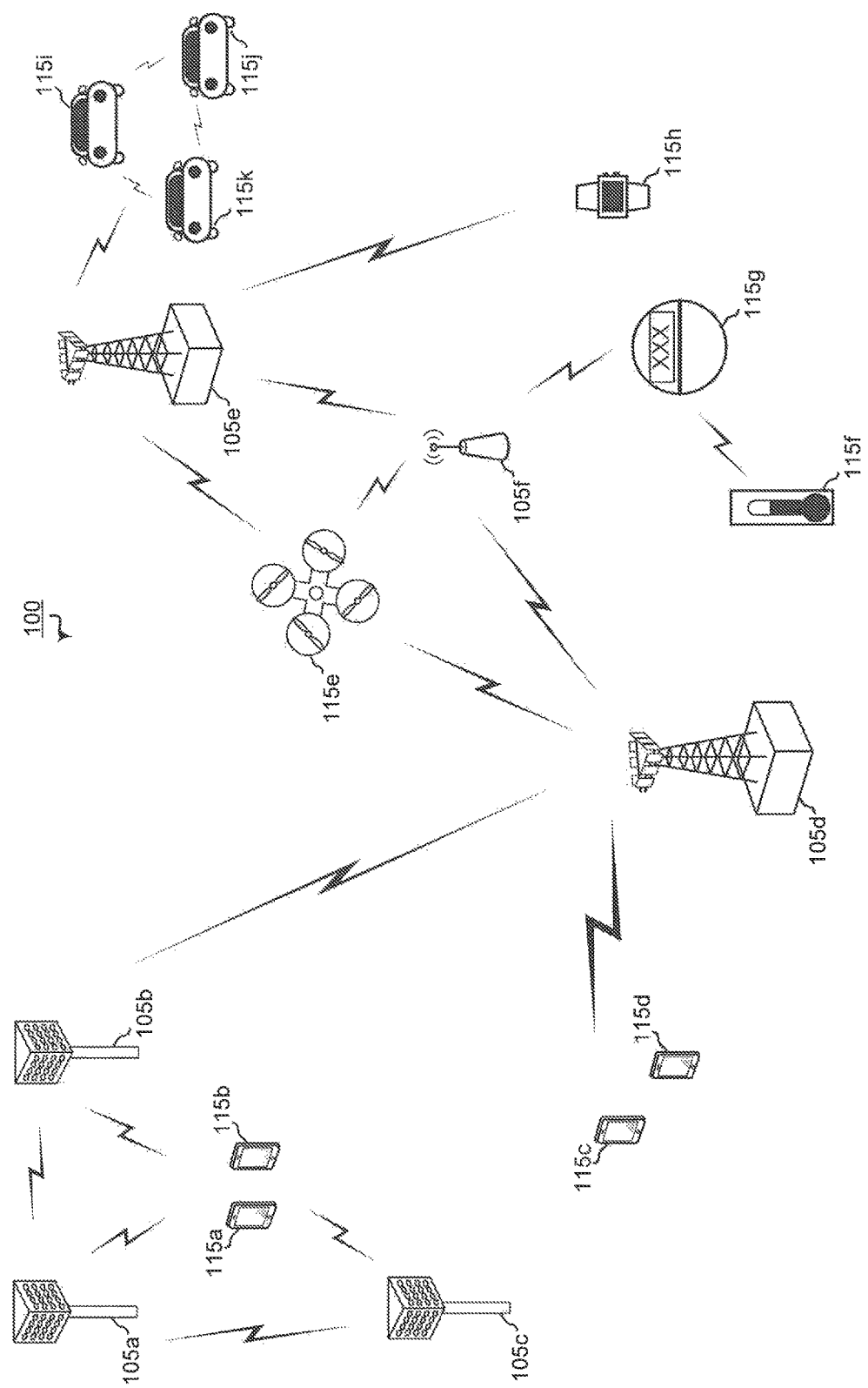
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low latency TDD/FDD communications, such as in a vehicle-to-vehicle (V2V) mesh network between UEs 115i-115k communicating with macro base station 105e.

Figure 2:
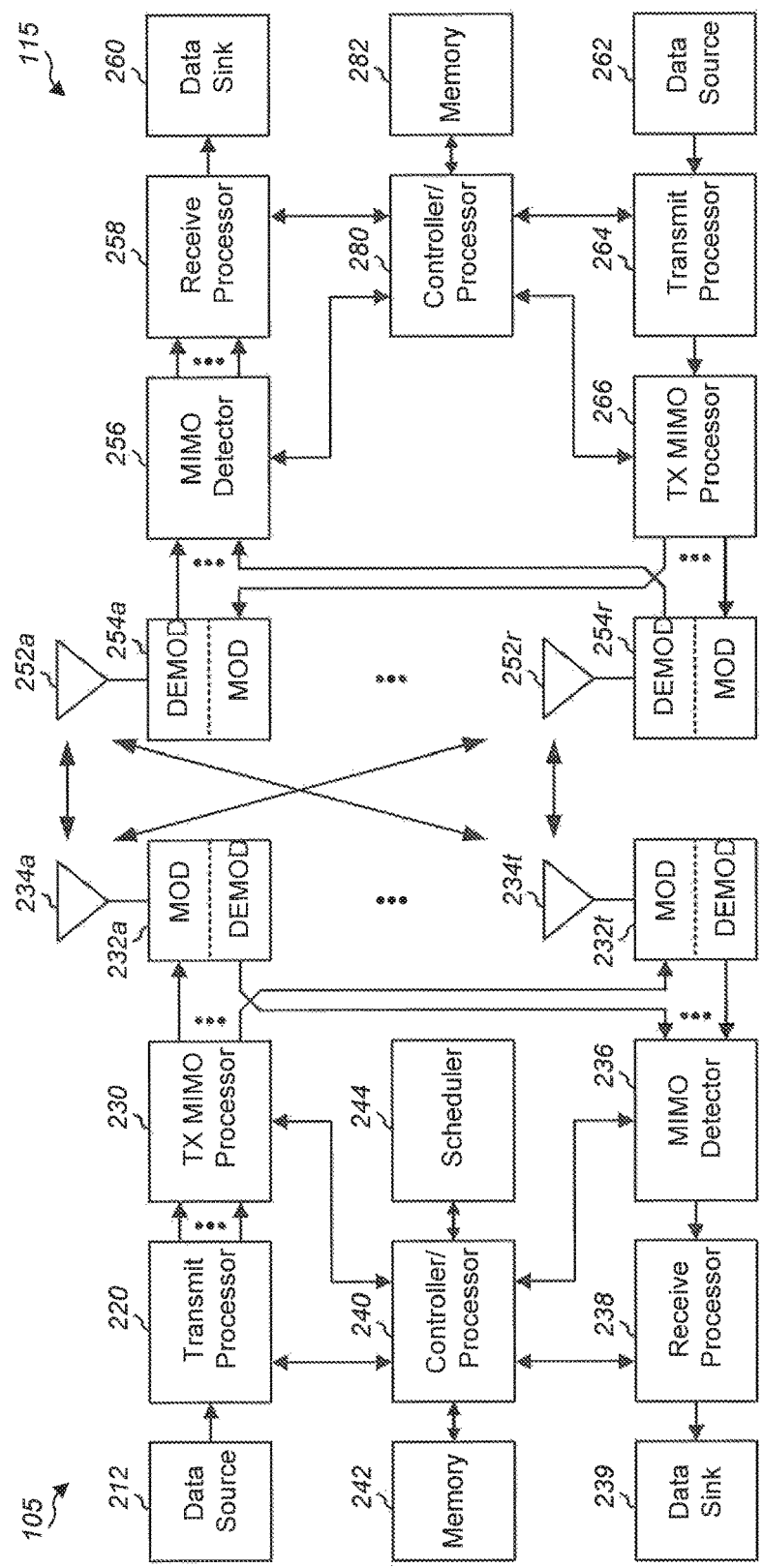
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A, 5B, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
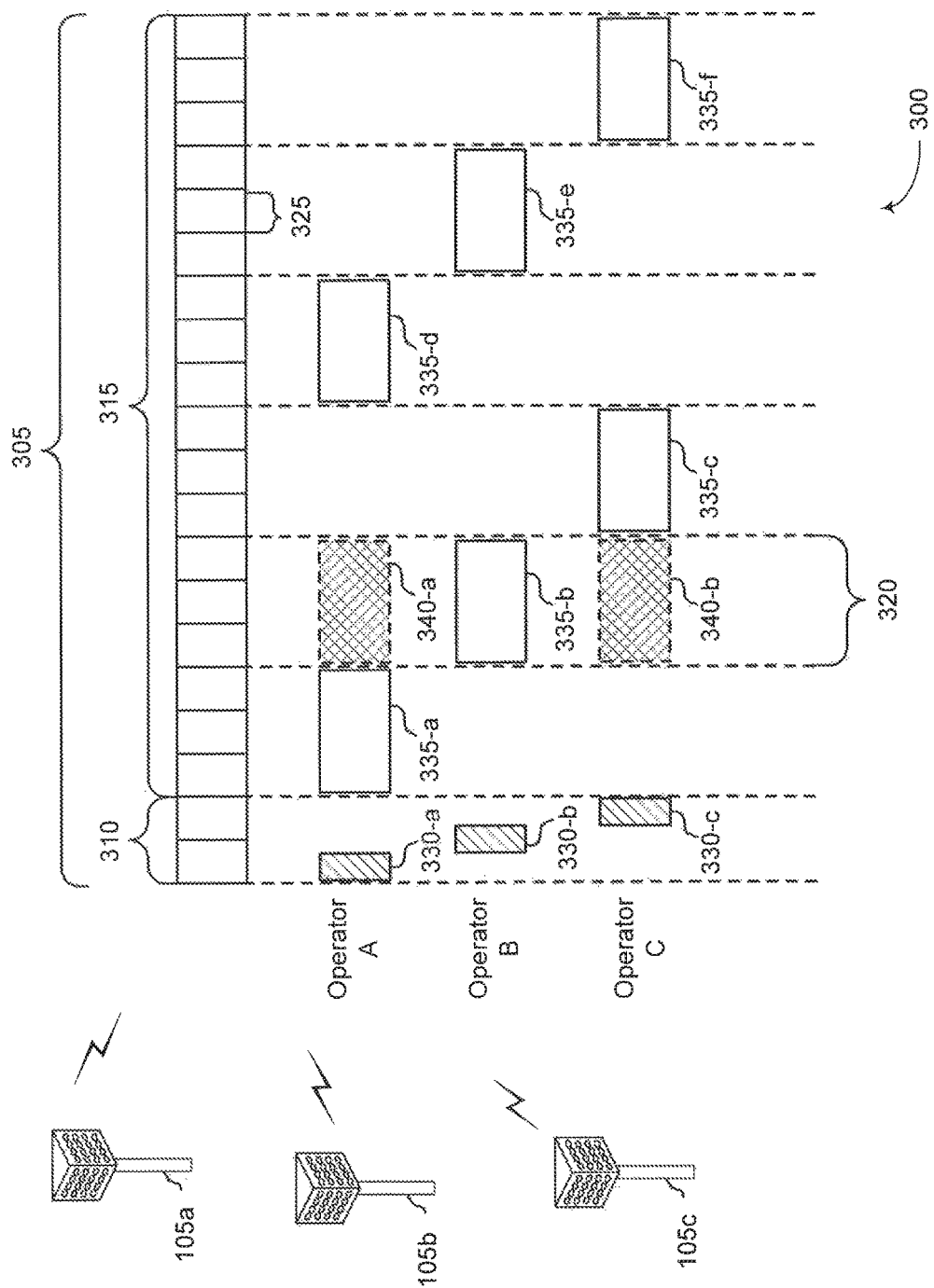
FIG. 3 illustrates an example of a timing diagram for coordinated resource partitioning.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, time superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g, UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACK) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-*e* may be prioritized for Operator B, and resources 335-*f* may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-*a* and resources 335-*b*), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-*a* without interference from the wireless nodes of Operator B or Operator C.

A network operating entity may additionally signal to another operator that it intends to use a particular G-INT. For example, referring to resources 335-*a*, Operator A may signal to Operator B and Operator C that it intends to use resources 335-*a*. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), hut are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a O-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Wireless operations that use coordinated multipoint (CoMP) transmissions include a range of different techniques that enable the dynamic coordination of transmission and reception over a variety of different base stations. CoMP generally falls into two major categories: joint processing, where there is coordination between multiple entities—base stations—that are simultaneously transmitting or receiving to or from UEs; and coordinated scheduling or beamforming, where a UE transmits with a single transmission or reception point, while the communication is made with an exchange of control among several coordinated entities. The joint processing form of CoMP also includes a subclass referred to as joint transmission, in which UE data is simultaneously processed and transmitted from multiple cooperating base stations. In heterogeneous and dense small cell network scenarios with low power nodes, UEs may experience significant signal strength simultaneously from multiple base stations. In order to manage both downlink and uplink joint transmission CoMP, accurate and up-to-date channel state information (CSI) feedback is used.

Figure 4A:
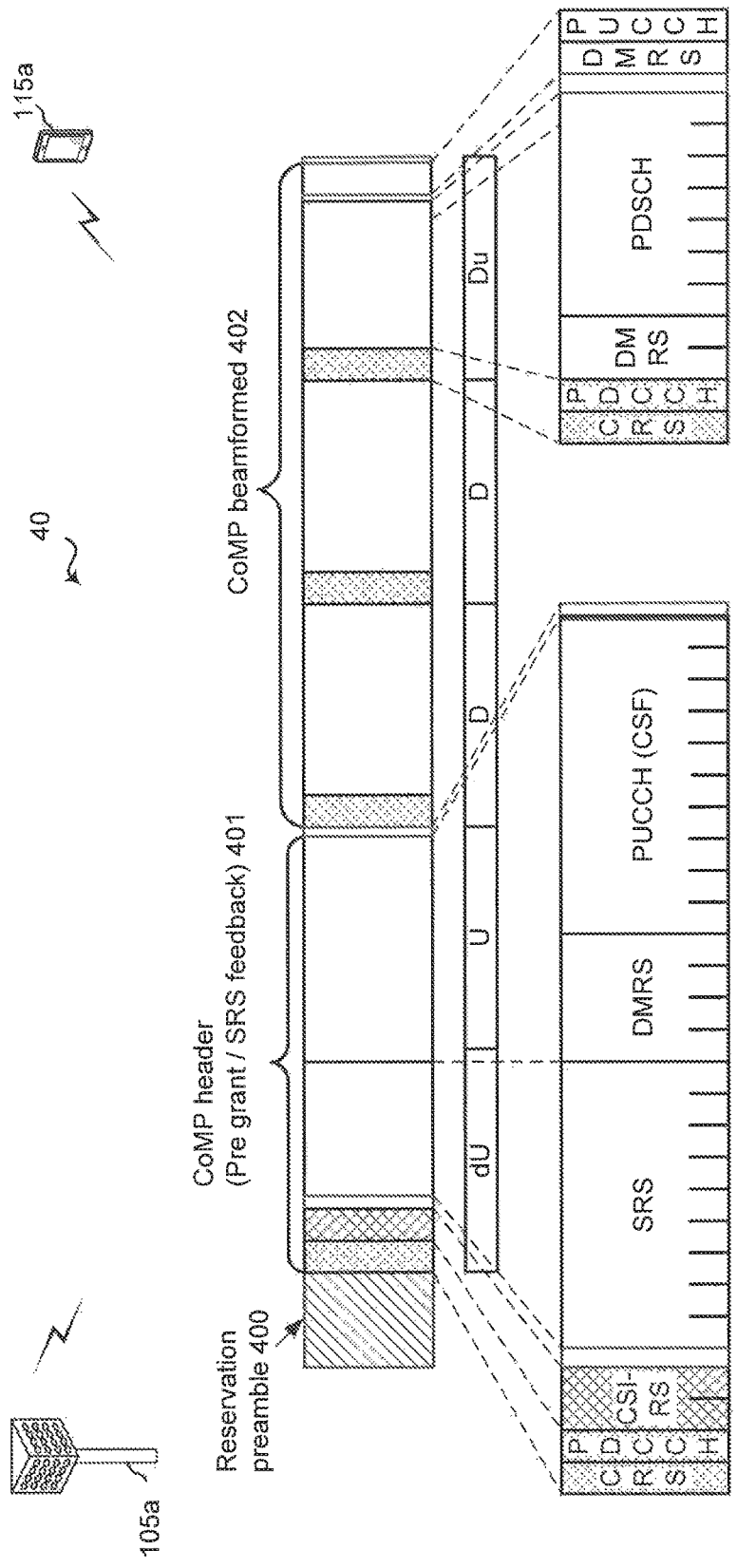
FIG. 4A shows block diagrams illustrating CoMP downlink and uplink data transmissions between a base station and a UE.
Figure 4B:
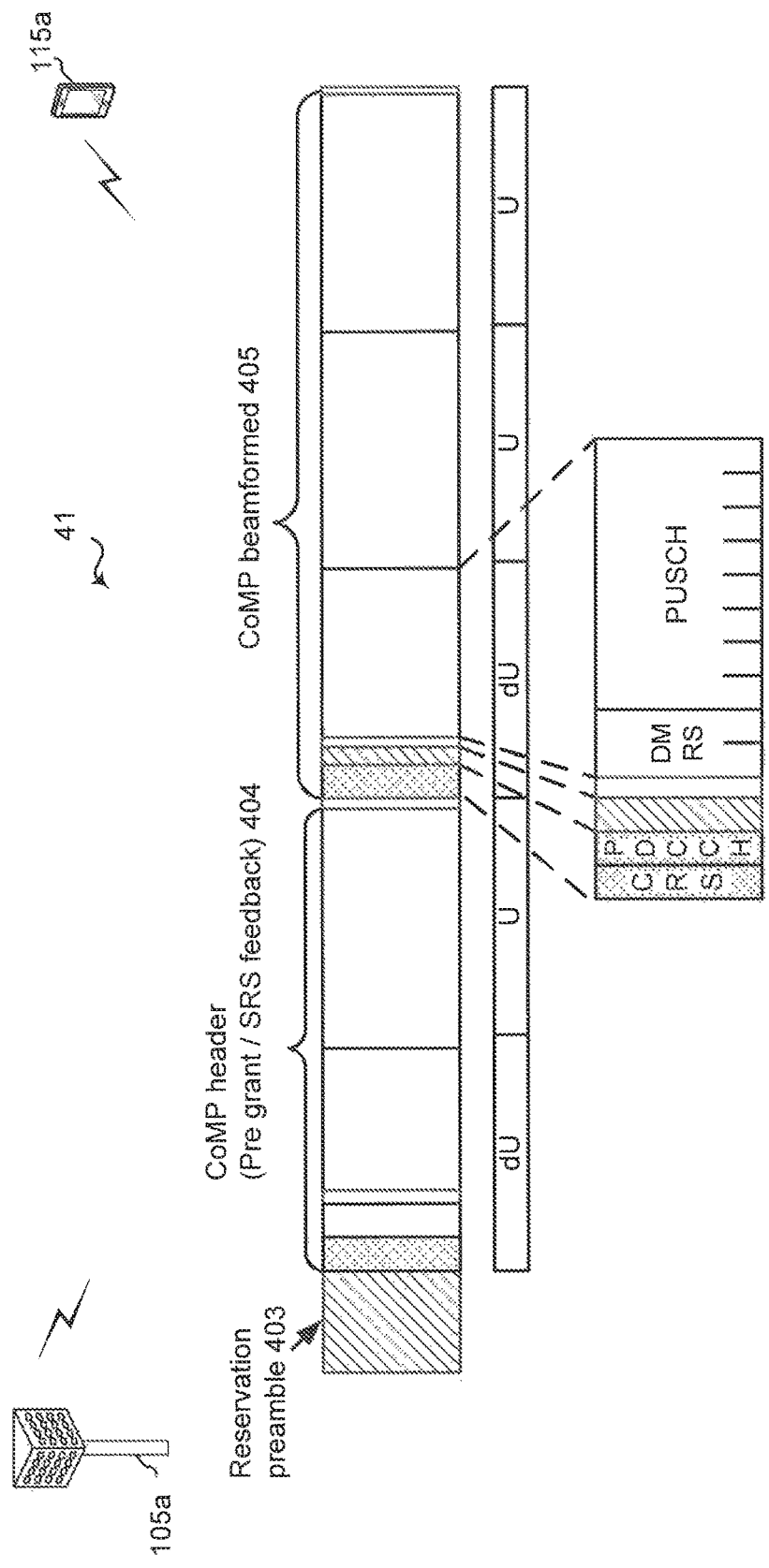
FIG. 4B shows block diagrams illustrating CoMP downlink and uplink data transmissions between a base station and a UE.

FIGS. 4A and 4B are block diagrams illustrating CoMP downlink and uplink data transmissions 40 and 41 between a base station 105a and UE 115a. Base station 105a and UE 115a participate in communications over a shared spectrum, such as according to NR-SS operations. Prior to communicating on the shared spectrum, the transmitting entity, base station 105a in FIG. 4A and UE 115a in FIG. 4B, performs an LBT procedure in reservation preambles 400 and 403. Once the channel has been secured, at the beginning of each of downlink CoMP data transmission 40 and uplink CoMP data transmission 41, sounding reference signal (SRS) feedback is transmitted by UE 115a within CoMP header 401 and 404. CoMP headers 401 and 404 include a downlink "pre-grant" of a SRS/channel state feedback (CSF) request, CSI-RS, along with an UL "pre-grant ACK," including the SRS and CSF (PUCCH) response to the request. The uplink CoMP operation is reciprocal to the downlink CoMP operation. Remote transmission points communicate in-phase and quadrature (I/Q) samples to a central base station. On the downlink, the base stations in the CoMP set jointly process the signal-to-leakage ratio (SLR) beamforming into the communication channel including the minimum mean square equalization (MMSE). On the uplink side, preceding is performed onto the channel again with MMSE equalization for the SLR beamforming.

In general, within the downlink CoMP operations (FIG. 4A), a base station, such as base station 105a, chooses UEs, such as UE 115a, to schedule and requests SRS feedback ("pre-grant"). UE 115a transmits SRS in addition to DMRS and the CSF within the PUCCH of downlink CoMP header 401. Base station 105a determines the SLR beams and modulation coding scheme (MCS) based on the SRS. Downlink beamformed data 402 includes downlink transmissions of control/data (e.g., CRS, downlink grants in the PDCCH, DMRS, PDSCH), which are transmitted via SLR-beamforming. At the end of downlink CoMP beamformed data 402, base station 105a receives uplink acknowledgement via the DMRS and PUCCH, which are received via MMSE (SLR) equalization.

Within the uplink CoMP operations (FIG. 4B), base station 105a chooses to schedule UE 115a and requests SRS feedback ("pre-grant") within uplink CoMP header 404. UE 115a transmits SRS for the "pre grant ACK" in uplink CoMP header 400, after which base station 105a determines the SLR beams and MCS. Downlink controls, such as CRS, uplink grants, and the like, may also be transmitted via SLR-beamforming. After uplink CoMP header 404, the data are received in uplink CoMP beamformed data 405 with DMRS and PUSCH via MMSE (SLR) equalization.

CoMP performance is mainly limited by channel accuracy at the base station as it affects beam selection. For each transmission opportunity, a phase synchronization is performed in the beginning of the transmission opportunity. However, a single phase synchronization per transmission opportunity may not be sufficient when the phase drift within the transmission opportunity is non-negligible. Because CoMP operations rely on the interoperations between multiple base stations, the phase coherence is much more strict as compared to single point processing. Non-negligible phase drift over the transmission opportunity can greatly degrade the CoMP performance. Accordingly, solutions have been suggested that provide a phase compensation reference signal (PCSR) that may be transmitted when the phase drift exceeds a predetermined threshold. The PCRS allows the base station or other transmitting node to compensate for the phase drift.

In general, CoMP joint transmission operations take advantage of the channel reciprocity that exists between the uplink and downlink channels. Accordingly, CoMP operations use very accurate gain and phase control. Calibration operations are used to counter gain/phase mismatches that arises between the transmit and receive operations. However, calibration operations are typically performed infrequently, in some instances every 1 minute, 1 hour, 1 day etc. Phase synchronization may occur across multiple base stations. The clocks of each of the base stations may have different jitter, such that at each listen before talk (LBT) opportunity, a different base station may reflect a different phase. For purposes of this application, an assumption will be made that the calibration has already been performed. The various aspects of the present disclosure will address the phase synchronization problem across base stations at each LBT.

Solutions have been suggested that address phase synchronization through inter-gNB cooperation. In such suggested solutions, the gNBs of the CoMP set are divided into two sets. The first set sends a first PSRS, and then after a small gap, the second set sends a second PSRS. The phase and timing drift may be determined by measuring the differences between the first and second PSRS.

Another suggested solution provides for UE-assisted operations for phase synchronization. In a first approach, downlink PSRS are transmitted to a UE, the UE analyzes the downlink channel based on the downlink PSRS and modulates an uplink PSRS using the downlink channel estimate. Thus, the uplink PSRS carries analog feedback of the downlink PSRS channel estimate and the base station may then determine the phase drift based on a comparison and measurement of the uplink PSRS and the downlink PSRS channel estimate.

In a second approach to the UE-assisted operations, the roles of modulation are reversed. The UE transmits an uplink PSRS. The base station receiving the uplink PSRS estimates the uplink channel and then modulates a downlink PSRS using the estimated uplink channel and, thus, carries the analog feedback of the uplink PSRS estimate. The UE calculates the phase and timing difference and feeds back the calculated phase and timing difference to the eNB, such as via PUSCH or PUCCH.

In a third approach to the UE-assisted operations, downlink PSRS are transmitted from multiple base stations in a CoMP group to a UE. In this approach, uplink PSRS are also transmitted from UEs to base stations of the CoMP group. Based on the received downlink PSRS, a UE can compute optimal co-phasing terms between pairs of base stations in the CoMP group from the downlink channel point of view of the UE. The UE then feeds back the co-phasing terms to the base station. The co-phasing term feedback may be wideband or per-subband depending on the symbol timing drift between the transmission points of base stations In this approach, based on the received uplink PSRS transmitted from the UEs within the coverage area of the CoMP group, the base station can compute an optimal co-phasing term between the PSRS sent by the UE and received by a pair of base stations from an uplink channel point of view. The delta or difference between the co-phasing terms fed back from the UE and the co-phasing term computed from the uplink PSRS is the phase correction value.

It should be noted that in execution of such operations, the uplink PSRS from the UE may correspond to an SRS, while the downlink PSRS from the base station may correspond to a CSI-RS.

Various aspects of the present disclosure are directed to determining a phase correction value based on a timing difference calculated from a difference between an uplink slope value calculated by a gNB and a feedback downlink slope value calculated by a UE from DL PSRS, and also based on a phase difference between a wideband co-phasing value calculated by the gNB and a feedback wideband co-phasing value calculated by the UE. For example, based on CSI-RS transmitted from the base stations in a CoMP group, a UE may compute optimal wideband co-phasing terms between the pairs of base stations in the CoMP group from the downlink channel point of view. In some aspects, computing the optimal wideband co-phasing terms may include computing co-phasing terms for each tone of a plurality of tones over a whole spectrum band. The per-tone co-phasing terms may then be aggregated to compute the wideband co-phasing term by the UE. The UE may also calculate a slope value from the per-tone co-phasing terms. In some aspects, the slope value may represent a slope due to the timing offset. In other aspects the lope value may represent a slope due to frequency phase ramping. In aspects, the slope value may indicate the slope of the per-tone co-phasing terms calculated by applying a successive maximum likelihood algorithm to the co-phasing terms computed for each tone of the plurality of tones over the whole spectrum band. The wideband co-phasing term and the slope value may be sent to the base station in a feedback report. It is noted that calculating the slope value may not be limited to applying a successive maximum likelihood algorithm to the co-phasing terms, and that other algorithms may be applied to obtain the slope value.

Similarly, based on the SRS transmitted from UEs within the coverage area of the CoMP group, the base station can compute an optimal co-phasing term between the SRS sent by the UE and received by a pair of base stations from an uplink channel point of view. In some aspects, computing the optimal wideband co-phasing terms may include computing co-phasing terms for each tone of a plurality of tones over a whole spectrum band. The per-tone co-phasing terms may then be aggregated to compute the wideband co-phasing term by the base station. The base station may also calculate a slope value from the per-tone co-phasing terms. In aspects, the slope value may indicate the slope of the per-tone co-phasing terms calculated by applying a successive maximum likelihood algorithm to the co-phasing terms computed for each tone of the plurality of tones over the whole spectrum band. In some aspects, the base station may determine a timing difference between a pair of base stations by calculating the difference between the calculated slope value and the slope value fed back from the UE.

The base station may apply the timing difference to the per-tone co-phasing terms to generate timing-adjusted co-phasing terms. The base station may then aggregate the timing-adjusted co-phasing terms to obtain a wideband co-phasing term. As noted above, the phase difference between gNBs may be determined based on the difference between the wideband co-phasing term calculated by the base station and the wideband co-phasing term fed back from the UE. A phase correction value may be determined based on the phase difference and the timing difference.

It is noted that during operations, the order of transmission is not restricted or limited to either the UE transmitting first or the base station transmitting first. Either node may transmit the first PSRS.

It is also noted that aspects of the present disclosure provide definite benefits over existing approaches. For example, the third approach to the UE-assisted operations involve transmitting, in the case of a non-negligible timing drift, the co-phasing terms, calculated by the UE, to the base station on a per subband basis, in which the whole spectrum is divided into multiple subbands. The base station then determines a timing difference based on the per subband co-phasing terms. Aspects of the present disclosure include computing a slope value from the per-tone co-phasing term calculated by the UE for each tone of a wideband incorporating the whole spectrum of the transmission. In some aspects, the whole spectrum of the transmission may be a predetermined and/or previously agreed subband of the entire spectrum of transmission. The slope value, which may be a single value, is sent to the base station in a feedback report, and the base station determines a time difference based on the slope value. As such, from aspects of the present disclosure, a size of the feedback payload may be reduced because, instead of including feedback co-phasing terms for each subband so that the base station may determine a timing difference, a single slope value may be sent from which the base station may derive the timing difference. Additionally, the disclosed technique provides a simpler and more accurate algorithm than previously used.

Figure 5A:
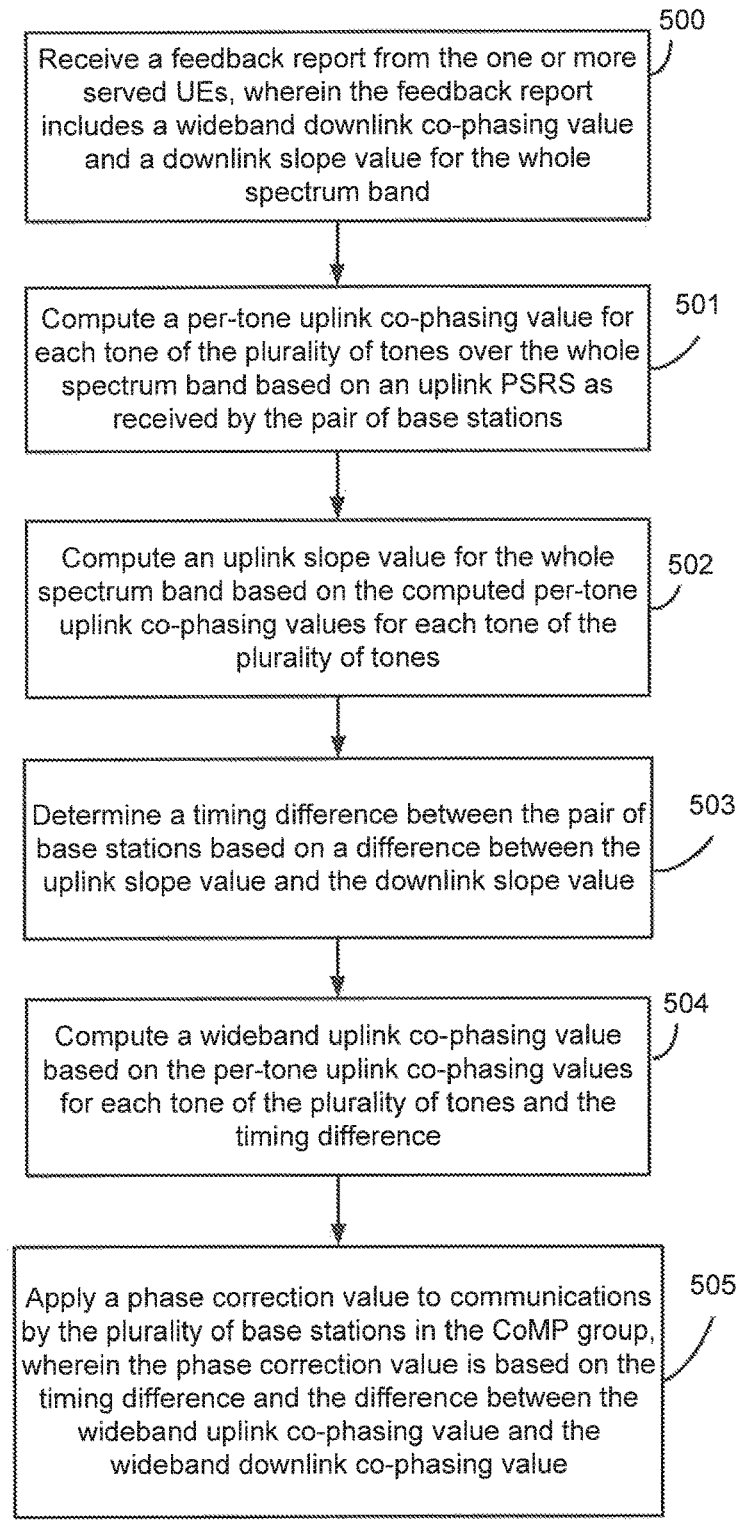
FIG. 5A illustrates example blocks executed to implement aspects of the present disclosure.
Figure 5B:
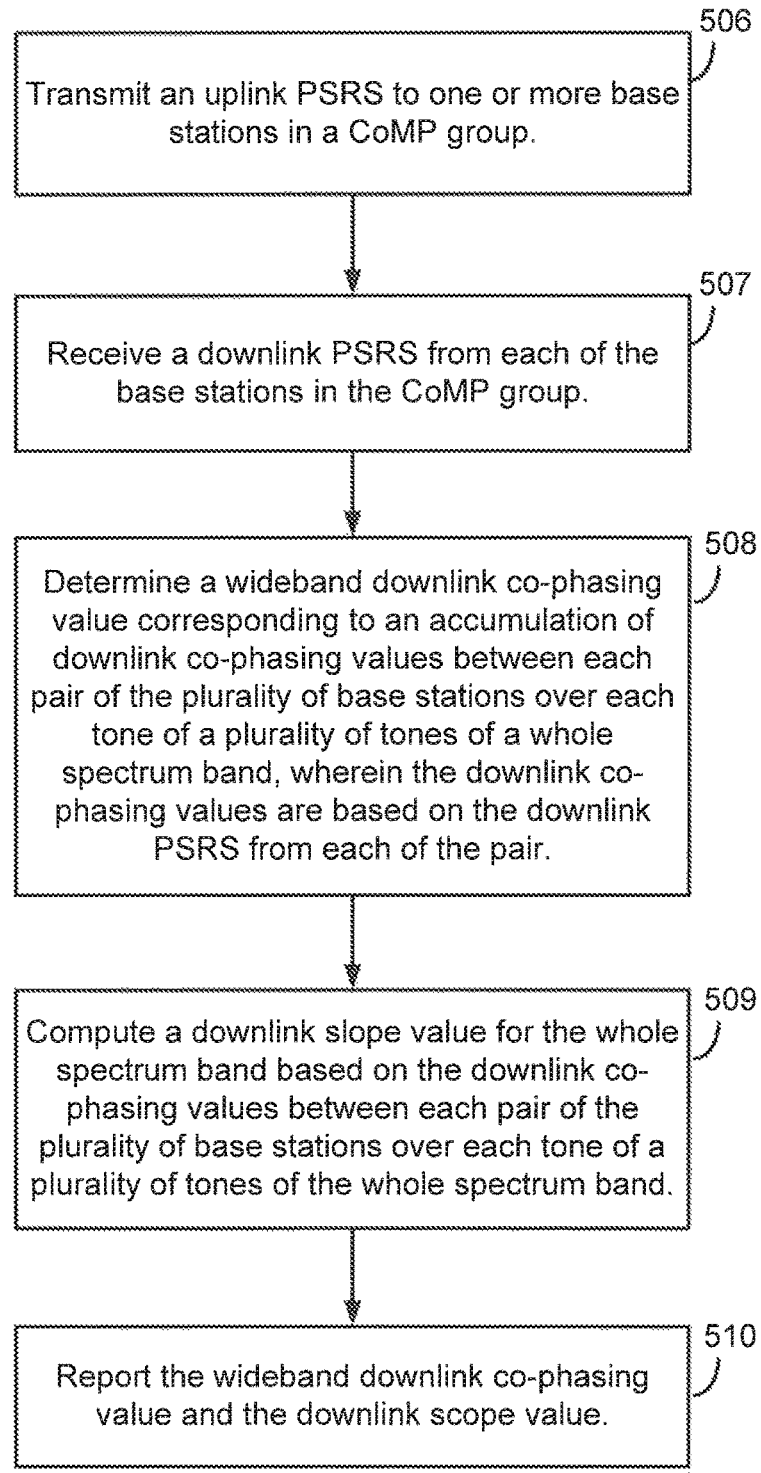
FIG. 5B illustrates example blocks executed to implement aspects of the present disclosure.
Figure 7:
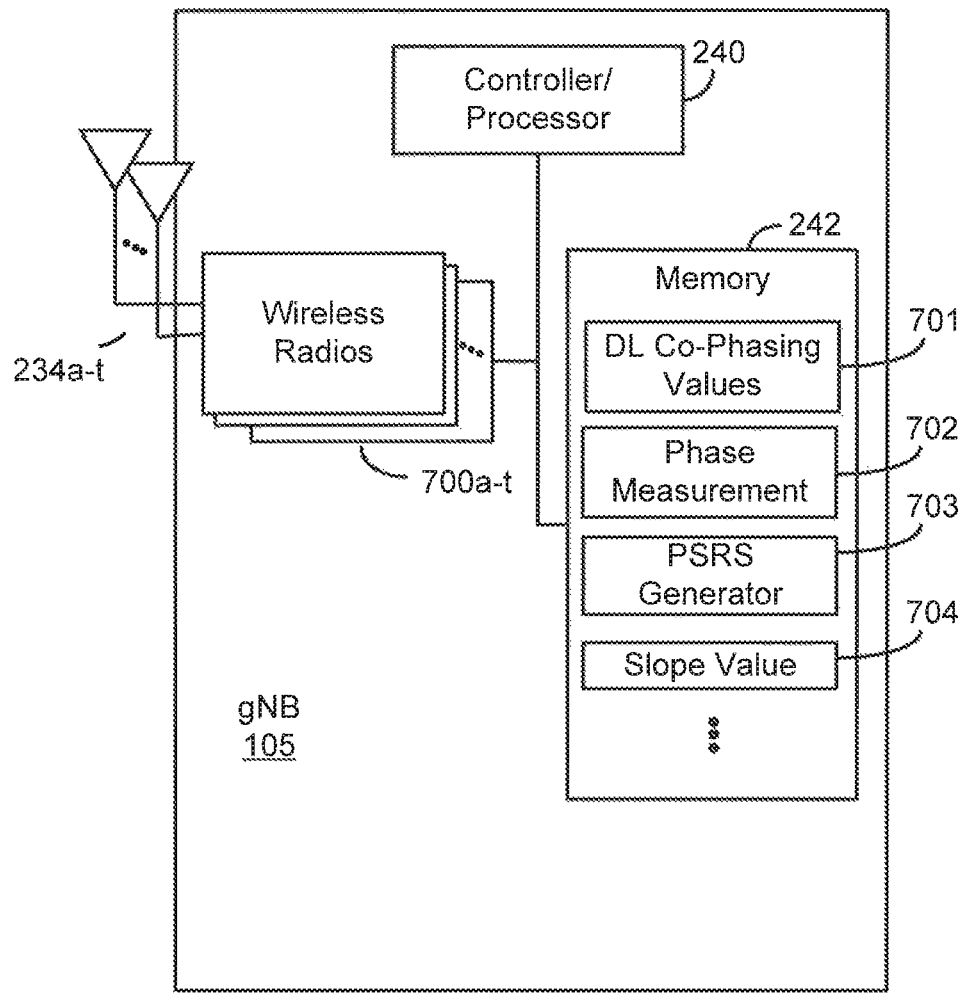
FIG. 7 is a block diagram illustrating example blocks executed to implement one aspect of the present disclosure.

FIGS. 5A and 5B are example blocks executed to implement aspects of the present disclosure. FIG. 5A illustrates the example blocks executed from the base station perspective. The example blocks will also be described with respect to gNB 105 as illustrated in FIG. 7. FIG. 7 is a block diagram illustrating gNB 105 configured according to one aspect of the present disclosure. gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 700a-t and antennas 234a-t. Wireless radios 700a-t includes various components and hardware, as illustrated in FIG. 2 for gNB 105, including modulator/demodulators 232a-t, MIMO detector 236, receive processor 238, transmit processor 220, and TX MIMO processor 230.

At block 500, a base station receives a feedback report from served UEs. The feedback report may include a wideband downlink co-phasing value corresponding to an accumulation of downlink co-phasing values for each of a plurality of tones over a whole spectrum band based on a downlink PSRS received at each of the served UEs from a pair of base stations. In some aspects, the downlink co-phasing values may represent a phase difference between downlink PSRS received at each of the UEs from the pair of base stations. In some aspects, the feedback report may also include a downlink slope value for the whole spectrum band. The downlink slope value may be based on the downlink co-phasing values for each of the plurality of tones over the whole spectrum band. For example, gNB 105 receives the feedback report from served UEs via antennas 234a-t and wireless radios 700a-t and stores the feedback report at 701 in memory 242. The downlink co-phasing values that are used to compute the wideband downlink co-phasing value included in the feedback reports transmitted by the UEs and received at gNB 105 an other base stations of the CoMP group may be based on the phase difference between pairs of downlink PSRS transmitted by gNB 105 and the other base stations of the CoMP group. Each of the base stations in the CoMP group may transmit downlink PSRS (e.g., CSI-RS). For example, base station 105, under control of controller/processor 240, may activate PSRS generator 703, stored in memory 242. The execution environment of PSRS generator 703 allows for the generation of a PSRS signal for transmission from base station 105 via wireless radios 700a-t and antennas 234a-t. The UEs receiving these downlink PSRS from the base stations, such as gNB 105 may compute per-tone co-phasing values, for each tone of plurality of tones over a whole spectrum band, as a phase difference between pairs of the base stations. The UEs may also compute downlink slope values from the per-tone co-phasing values, and may also determine wideband downlink co-phasing values based on an accumulation of the per-tone co-phasing values. The UEs may generate feedback reports that include the downlink slope values and the wideband downlink co-phasing values, and may send the feedback reports to one or more of the base stations in the CoMP group. In one example, the downlink co-phasing value may correspond to the angle difference between the downlink PSRS of the base station pair.

At block 501, the base station computes a per-tone uplink co-phasing value for each tone of the plurality of tones over the whole spectrum band based on an uplink PSRS as received by the pair of base stations. In aspects, the UEs each may transmit an uplink PSRS (e.g., SRS for sounding the channel). The base stations, such as base station 105, may receive the uplink PSRS via antennas 234a-t and wireless radios 700a-t. The per-tone uplink co-phasing value for each tone may be based on a phase difference between the uplink PSRS received at the pair of the base stations. For example, phase measurement 702, stored in memory 242 may be executed by gNB 105 under control of controller/processor 240. Using the uplink PSRS (e.g., SRS) received by the pair of base stations and sent by the same UE, such as through execution of PSRS generator 802, wireless radios 800a-r, and antennas 234a-t, the execution environment of phase measurement 702 may allow gNB 105 to compute an uplink co-phasing value, for each tone of a plurality of tones over a whole spectrum band, as a phase difference between two of the uplink PSRS sent by the UE. In one example, the uplink co-phasing value may correspond to the angle difference between the two uplink PSRS of the UE received at the pair of base stations.

At block 502, the base station may compute an uplink slope value for the whole spectrum band based on the computed per-tone uplink co-phasing values for each tone of the plurality of tones. In aspects, the uplink slope value may be computed by applying a successive maximum likelihood algorithm to the per-tone co-phasing values computed by the base station at step 501. For example, the execution environment of slope value 704 may allow gNB 105 to apply a successive maximum likelihood algorithm to the per-tone uplink co-phasing values to compute an uplink slope value of the uplink co-phasing values.

At block 503, the base station determines a timing difference between the pair of base stations based on a difference between the uplink slope value and the downlink slope value. For example, gNB 105, under control of controller/processor 240, may calculate the difference between the downlink slope value received in the feedback report from a served UE and the uplink slope value calculated at block 502. In aspects, the difference between the uplink slope value and the downlink slope value is used to calculate the timing difference between the pair of base stations.

At block 504, the base station computes a wideband uplink co-phasing value based on the per-tone uplink co-phasing values for each tone of the plurality of tones and the timing difference. In aspects, the base station may apply the timing difference to the per-tone uplink co-phasing values to generate timing-adjusted per-tone uplink co-phasing values. The base station may then accumulate the timing-adjusted per-tone uplink co-phasing values for each tone in the whole spectrum band to compute the wideband uplink co-phasing value.

At block 505, the base station determines a phase correction value to apply to communications by the base stations in the CoMP group. The phase correction value may be based on the timing difference calculated from the difference in the calculated uplink slope value and the reported downlink slope value, and may also be based on the difference between the computed wideband uplink co-phasing value and the reported wideband downlink co-phasing value. For example, gNB 105, under control of controller/processor 240, can determine the phase correction value by computing the timing difference according to block 503, and by comparing and computing the difference between the wideband uplink co-phasing value computed by the base station and the wideband downlink co-phasing value received in the feedback report. That correction value may be used among the base stations of the CoMP group to adjust communications accordingly, such as by adjusting the phase and timing at wireless radios 700a-t.

Figure 8:
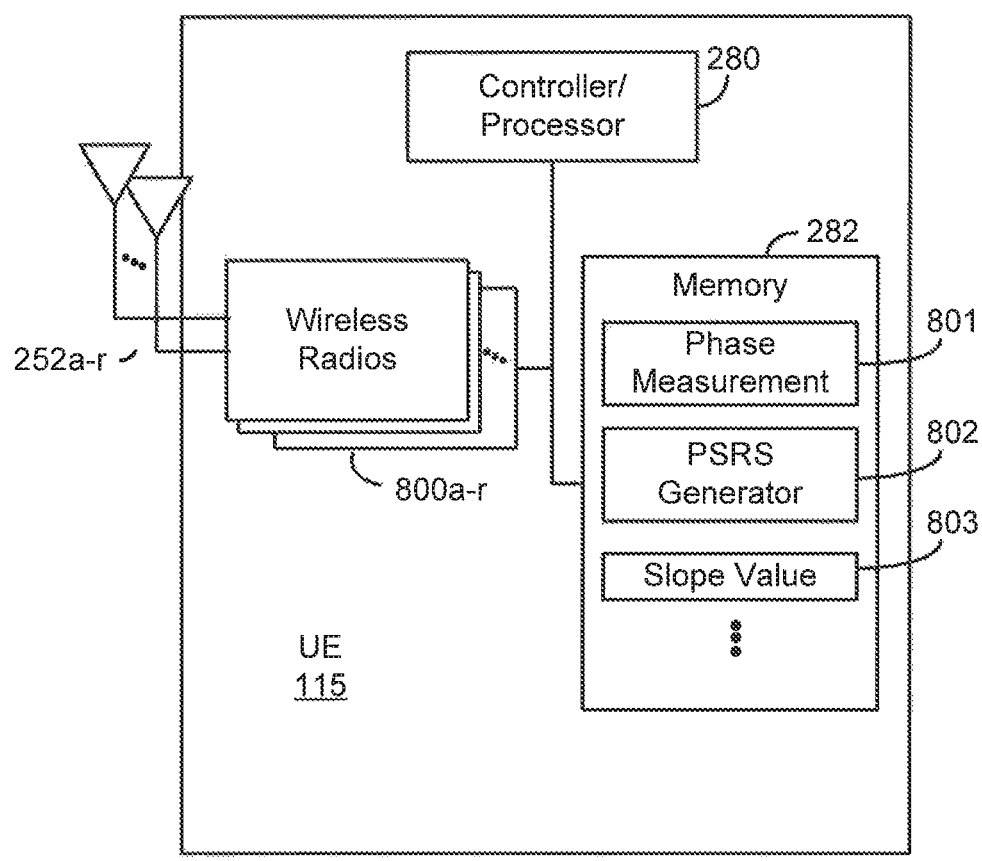
FIG. 8 is a block diagram illustrating an eNB configured according to one aspect of the present disclosure.

FIG. 5B illustrates the example blocks executed by a UE being served by a CoMP group of base stations according to one aspect of the disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 506, the UE transmits an uplink PSRS to the base stations of the CoMP group. The UE transmits the uplink PSRS, which may be an SRS. For example, UE 115, under control of controller/processor 280, executes PSRS generator 802, stored in memory 282. The execution environment of PSRS generator 802 generates a PSRS (e.g., an SRS) for transmission via wireless radios 800a-r and antennas 252a-r. As indicated with regard to FIG. 5A, each base station of the CoMP group will receive the uplink PSRS. The uplink co-phasing values may be determined by computing the phase difference between the uplink SRS as received by a pair of the base stations in the CoMP group. The uplink slope values may be computed based on the uplink co-phasing values.

At block 507, the UE receives a downlink PSRS from each of the base stations in the CoMP group. For example, UE 115 will receive a downlink PSRS from the multiple base stations operating in the CoMP group using antennas 252a-r and wireless radios 800a-r. The downlink PSRS may correspond to CSI-RS transmitted by the base stations.

At block 508, the UE determines a wideband downlink co-phasing value corresponding to an accumulation of downlink co-phasing values between each pair of the plurality of base stations over each tone of a plurality of tones of a whole spectrum band. In some aspects, the base station determines the wideband downlink co-phasing value by first computing downlink co-phasing values between each pair of the base stations representing a phase difference between the downlink PSRS from each of the pair over each tone of a whole spectrum band. The downlink co-phasing values over each tone are then accumulated to obtain a wideband downlink co-phasing value over the whole spectrum band. For example, UE 115, under control of controller/processor 280, executes phase measurement 801, stored in memory 282. Through the execution environment of phase measurement 801, UE 115 determines the phase difference between the downlink PSRS from pairs of the different base stations of the CoMP group over each tone of the plurality of tones of the whole spectrum band. Of the plurality of base stations operating in the CoMP group, UE 115 will pair the plurality for determining the co-phasing value, thus, computing a downlink co-phasing value for each of the pair. UE 115, under control of controller/processor 280, may then aggregate the per-tone downlink co-phasing values for each pair over the whole spectrum to obtain a wideband downlink co-phasing value for each of the pair.

At block 509, the UE computes a downlink slope value for the whole spectrum band based on the downlink co-phasing values between each pair of the plurality of base stations over each tone of a plurality of tones of the whole spectrum band. In aspects, the downlink slope value may be computed by applying a successive maximum likelihood algorithm to the downlink co-phasing values between each pair of the plurality of base stations computed by the UE at step 508 over each tone in the whole spectrum band. For example, the execution environment of slope value 803 may allow UE 115 to apply a successive maximum likelihood algorithm to the per-tone downlink co-phasing values between each pair of the plurality of base stations to compute a downlink slope value.

At block 510, the UE reports the wideband downlink co-phasing value and the downlink slope value for the whole spectrum band. In aspects, the wideband downlink co-phasing value and the downlink slope value may be reported in a feedback report to base stations in the CoMP group. For example, after determining the wideband downlink co-phasing value and the downlink slope value, UE 115 may generate a feedback report that includes the wideband downlink co-phasing value and the downlink slope value and transmit the feedback report via wireless radios 900a-r and antennas 252a-r.

It should be noted that in operation to synchronize the phase and timing, a fewer number of base stations of the total in the CoMP group may be involved in determining the phase correction value and adjusting the communications among the CoMP group.

In implementing the various aspects of the present disclosure, the downlink PSRS may be implemented by CSI-RS transmitted from the base stations, while the uplink PSRS may be implemented by SRS transmitted from the UEs. Thus, the downlink channel may be estimated from CSI-RS, and uplink channel may be estimated from SRS.

In one example, the downlink and uplink channels may be estimated according to the following equations:

$$y_{ij}^{t,r}(k) = H_{DL,ij}^{t,r}\left[\exp\left(-\frac{J2\pi k\tau_j^{DL}}{N}\right)\right]\left[\exp\left(-\frac{J2\pi\xi_{BT,i}}{N}\right)\exp\left(\frac{J2\pi k\xi_{UR,j}}{N}\right)\right] \quad (1)$$
$$[\exp(-J\varphi_{BT,i})\exp(J\varphi_{UR,j})] + n_j^r(k)$$

$$z_{ji}^{t,r}(k) = H_{UL,ji}^{t,r}\left[\exp\left(-\frac{J2\pi k\tau_j^{UL}}{N}\right)\right]\left[\exp\left(\frac{J2\pi\xi_{BR,i}}{N}\right)\exp\left(-\frac{J2\pi k\xi_{UT,j}}{N}\right)\right] \quad (2)$$
$$[\exp(J\varphi_{BR,i})\exp(-J\varphi_{UT,j})] + w_i^t(k)$$

Where $y_{ij}$ represent the downlink signal of a base station i to a UE j, and $z_{ji}$ represents the uplink signal of a UE j to a base station i. k represents the specific tone within a set of tones, K, over which the channel estimate will occur. $H_{DL,ij}^{t,r}(k) = H_{UL,ij}^{r,t}(k)$ corresponds to the over the air downlink/uplink channel between gNB i, antenna t, to UE j, antenna r at subcarrier k. $\tau_j^{DL}$ corresponds to the timing offset due to UE TTL between transmitter of all the gNBs to UE j receiver. $\xi_{BT,i}$ is the transmitter timing offset introduced by the clock jitter of gNB i. $\xi_{UR,j}$ is the receiver timing offset introduced by the clock jitter of UE j. $\varphi_{BT,i}$ is the phase uncertainty introduced by the clock jitter of gNB i. $\varphi_{UR,j}$ is the phase uncertainty introduced by clock jitter of UE j. $\varphi_{UR,j}$ is the phase uncertainty introduced by clock jitter of UE j. $\tau_j^{UL}$ is the timing offset between UE j transmitter to all the gNB receivers due to gNB TTL. $\xi_{BR,i}$ is the receiving timing offset introduced by the clock jitter of gNB i. $\xi_{UT,j}$ is the receiver timing offset introduced by the clock jitter of UE j. $\varphi_{BR,i}$ is the phase uncertainty introduced by the clock jitter of gNB i. $\varphi_{UT,j}$ is the phase uncertainty introduced by clock jitter of UE j. $w_i^t(k)$ is the additive noise of gNB i, antenna t.

In each of equations (1) and (2), the terms represent differing phase and timing drift elements. For reference, each of the different phase and timing drift elements has been bracketed together. For example, the first exponential function corresponds to the symbol timing drift due to the transistor-to-transistor logic (TTL). The second and third exponential functions correspond to the symbol timing drift due to the phase locked loops (PLLs) of the analog-to-digital converter (ADC)/digital-to-analog converter (DAC). The fourth and fifth exponential functions correspond to the phase drift due to the up/down conversion PLL.

In traditional approaches, the channel estimation, and thus the co-phasing terms calculation, may be performed either over a wideband incorporating the whole spectrum of the transmission, or may be performed on a per-subband basis, in which the whole spectrum is divided into multiple subbands. The determination of whether to perform wideband or per-subband channel estimation will depend on the timing drift, which corresponds to the second two exponential functions identified in equations (1) and (2). For example, if timing drift is negligible, e.g., $\xi_{BT,i}=0$ and $\xi_{BR,i}=0$, then a wideband approach is taken, and if timing drift is not negligible, then subband feedback is used. Aspects of the present disclosure provide techniques that enable the use of a wideband approach without a need to perform per-subband estimation or feedback. By calculating and providing a slope value of the co-phasing values over each tone of a whole spectrum band, a timing difference between two gNBs may be obtained without a need to feedback the co-phasing values for each subband. Additionally, whether the timing drift is negligible or not is irrelevant to determining the timing difference, as the timing difference is obtained from the slope values.

UE j gets the downlink channel estimate from gNBs $i_1$ and $i_2$, and calculates downlink co-phasing values for each tone in a whole spectrum band according to:

$$y_{i_1,j}^{t,r}(k)(y_{i_2,j}^{t,r}(k))^* = H_{DL,i_1,j}^{t,r}(k)\left(H_{DL,i_2,j}^{t,r}(k)\right)^* \quad (3)$$

$$\exp\left(-\frac{J2\pi k(\xi_{BT,i_1}-\xi_{BT,i_2})}{S}\right)\exp(j(\varphi_{BT,i_1}-\varphi_{BT,i_2}))$$

The UE may compute a wideband downlink co-phasing term for the whole spectrum band by accumulating the downlink co-phasing values for each tone in the whole spectrum band. The UE may then feedback the angle of the difference between gNBs $i_1$ and $i_2$ based on the wideband downlink co-phasing term according to:

$$\text{angle}\left(\sum_k (y_{i_1,j}^{t,r}(k)(y_{i_2,j}^{t,r}(k))^*)\right) = \quad (4)$$

$$\text{angle}\left(\exp(-J(\varphi_{BT,i_1}-\varphi_{BT,i_2}))\exp\left(-\frac{J2\pi k(\xi_{BT,i_1}-\xi_{BT,i_2})}{N}\right)\right.$$

$$\left.\sum_k \left(H_{DL,i_1,j}^{t,r}(k)\left(H_{DL,i_2,j}^{t,r}(k)\right)^*\right)\right)$$

The UE may also calculate a downlink slope value based on the per-tone downlink co-phasing values. The downlink slope value may be calculated by applying a successive maximum likelihood algorithm to the per-tone downlink co-phasing values calculated using equation (3).

gNBs $i_1$ and $i_2$ obtain the uplink channel estimate from UE j, and calculate uplink co-phasing values for each tone in the whole spectrum band according to:

$$z_{ji_1}^{r,t}(k)(z_{ji_2}^{r,t}(k))^* = H_{UL,ji_1}^{r,t}(k)\left(H_{UL,ji_2}^{r,t}(k)\right)^* \quad (5)$$

$$\exp\left(-\frac{J2\pi k(\xi_{BR,i_1}-\xi_{BR,i_2})}{N}\right)\exp(J(\varphi_{BR,i_1}-\varphi_{BR,i_2}))$$

The gNB may calculate an uplink slope value based on the per-tone uplink co-phasing values. The uplink slope value may be calculated by applying a successive maximum likelihood algorithm to the per-tone uplink co-phasing values calculated using equation (5).

The gNB may then calculate the difference between the uplink slope value calculated by the gNB and the downlink slope value received in the feedback from the UE. The gNB may then use the difference between the two slope values to determine a timing difference between two gNBs. For example, using the successive maximum likelihood algorithm, the gNB may calculate the slope using $\xi_{BA,i_1}-\xi_{BR,i_2}+$other_terms. Using the DL PSRS, the UE may calculate the slope as $\xi_{BT,i_1}-\xi_{BT,i_2}+$other_terms. The difference between the two slope values may be the timing difference.

The gNB may generate timing-adjusted uplink co-phasing values. The timing-adjusted uplink co-phasing values may be generated by applying the timing difference calculated from the uplink slope value and the downlink slope value to the per-tone uplink co-phasing values calculated using equation (5) according to:

$$z_{ji_1}^{r,t}(k)(z_{ji_2}^{r,t}(k))^* = H_{UL,ji_1}^{r,t}(k)\left(H_{UL,ji_2}^{r,t}(k)\right)^* \quad (6)$$

$$\exp\left(-\frac{J2\pi k(k_{BT,i_1}-k_{BT,i_2})}{N}\right)\exp(J(\varphi_{BR,i_2}-\varphi_{BR,i_2}))$$

The timing-adjusted uplink co-phasing values may be used to generate a wideband uplink co-phasing term for the whole spectrum band by accumulating the timing-adjusted uplink co-phasing values for each tone in the whole spectrum band. The gNB may then calculate the angle according to:

$$\text{angle}\left(\sum_k (z_{ji_1}^{r,t}(k\ldots(k))^*)\right) = \quad (7)$$

$$\text{angle}\left(\exp(J(\varphi_{BR,i_1}-\varphi_{BR,i_2}))\exp\left(-\frac{J2\pi k(\xi_{BT,i_1}-\xi_{BT,i_2})}{N}\right)\right.$$

$$\left.\sum_k \left(H_{UL,ji_1}^{r,t}(k)\left(H_{UL,ji_2}^{r,t}(k)\right)^*\right)\right)$$

The phase difference between gNBs $i_1$ and $i_2$ would correspond to the angle computed according to:

$$\text{angle}(\Sigma_{k_n}(y_{i_1j}^{t,r}(k))(y_{i_2j}^{t,r}(k))^*)) - \text{angle}(\Sigma_{k_n}(z_{ji_1}^{r,t}(k)) \widetilde{(z_{ji_2}^{r,t}(k)^*))} \quad (8)$$

The gNB may then apply a phase correction value to the base stations in the CoMP group. The phase correction value may be based on the timing difference calculated from the difference between uplink slope value calculated by the gNB and the downlink slope value received in the feedback from the UE, and may also be based on the phase difference calculated using equation 8.

Figure 6:
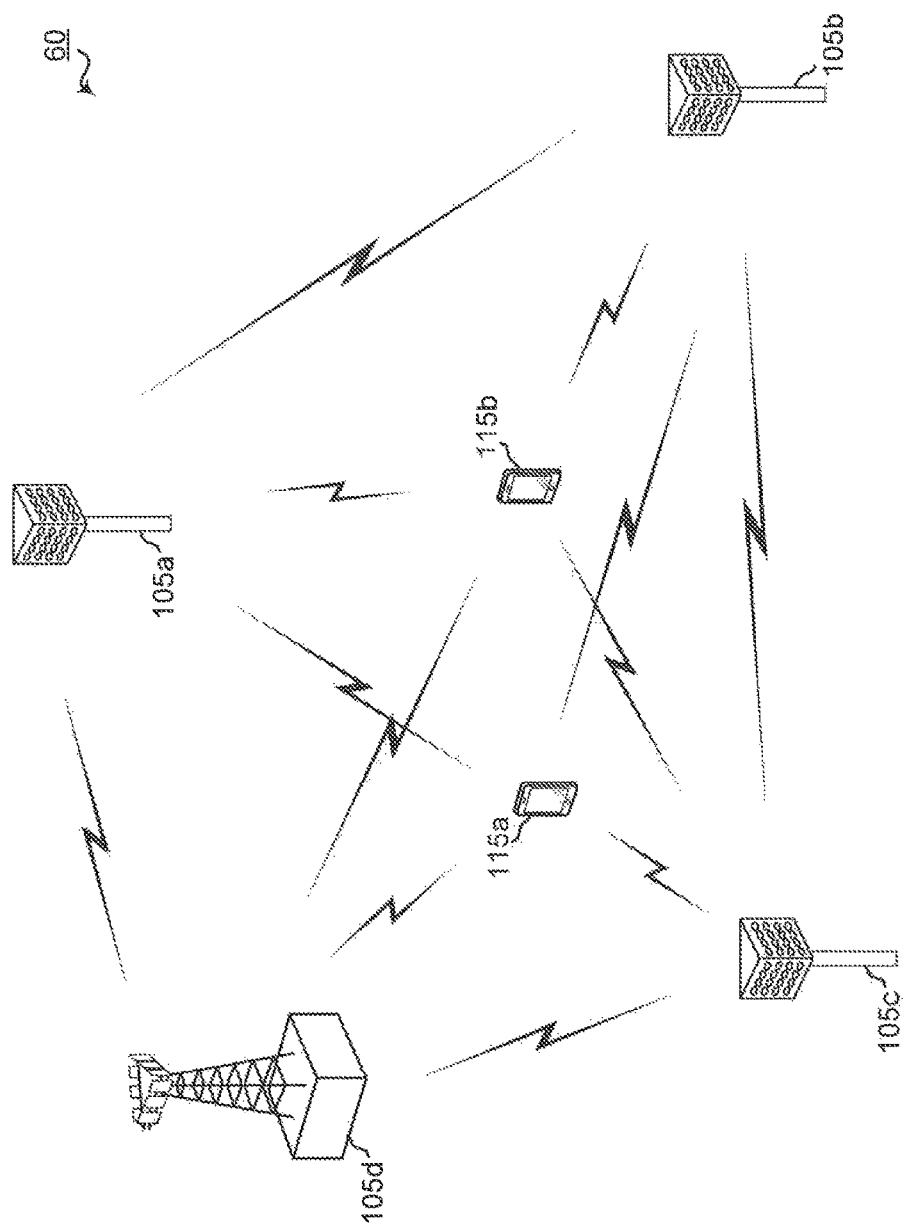
FIG. 6 is a block diagram illustrating an example CoMP operation network configured according to one aspect of the present disclosure.

FIG. 6 is a block diagram illustrating an example CoMP operation network 60 configured according to one aspect of the present disclosure. Base stations 105a-d operate in a CoMP group serving various users, such as UEs 115a-b. In operation of the described aspect, base stations 105a-d each send a downlink PSRS (e.g., configured as a CSI-RS) and each of the served UEs, UEs 115a-b, sends an uplink PSRS (e.g., configured as an SRS). There is no requirement that one or the other of the downlink or uplink PSRS are sent first. At the UEs, each of the UEs, such as, for example, UE 115a receives each of the CSI-RS and, computes a co-phasing value between each pair of the base stations in the CoMP group over each tone of a whole spectrum band of the transmission. For example, UE 115a computes an angle difference between the CSI-RS received from base stations 105a-105b, between the CSI-RS received from base stations 105b-105c, and so on until there is an angle representing the co-phasing value for each pair of base stations in the CoMP group over each tone of the whole spectrum band. UE 115a accumulates the co-phasing values for each tone to compute a wideband downlink co-phasing value. UE 115a also computes a downlink slope value from the co-phasing value for each tone of the whole spectrum band. UE 115a may then report the wideband downlink co-phasing value and the downlink slope value on the downlink CSI-RS transmitted from each of the base stations in the CoMP group.

On the base station side, the base stations, such as base station 105a, receives the SRS from UEs 115a-b. Base station 105a would compute the co-phasing value between the SRS received from UEs 115a at both base station 105a and base station 105b, for example, over each tone of the whole spectrum band. Base station 105a would compute the co-phasing value as a phase difference between the SRS from UE 115a as received by both base stations of the paired group (e.g., 105a-105b, 105a-105c, 105a-105d, etc.). Base station 105a also computes an uplink slope value from the co-phasing value for each tone of the whole spectrum band. Once base station 105a receives the reported wideband downlink co-phasing value from UEs 115a-b and the downlink slope value, it may determine a timing difference based on the differences between the calculated uplink slope value and the feedback downlink slope value, and may apply the uplink slope value to the calculated co-phasing values. Base station 105a may then accumulate the co-phasing values for each tone to compute a wideband uplink co-phasing value. Base station 105a may then determine the phase difference based on the difference between the reported wideband downlink co-phasing value and the computed wideband uplink co-phasing value for each UE. Base station 105a may determine the phase correction value based on the phase difference and the timing difference. Base station 105a would then use the phase correction value to adjust the communications of the base stations in the CoMP group.

In some aspects, the co-phasing terms may not be explicitly signaled to the other network entity, but, instead, implicitly signaled to the other entity by using the co-phasing value to modulate the PSRS transmitted to the other entity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5B, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a base station of a plurality of base stations in a coordinated multipoint (CoMP) group serving one or more served user equipments (UEs), a feedback report from the one or more served UEs, wherein the feedback report includes:
   a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and
   a downlink slope value for the whole spectrum band based on the downlink co-phasing values for each of the plurality of tones over the whole spectrum band;
   computing, at the base station, a per-tone uplink co-phasing value for each tone of the plurality of tones over the whole spectrum band based on an uplink PSRS as received by the pair of base stations;
   computing, at the base station, an uplink slope value for the whole spectrum band based on the computed per-tone uplink co-phasing values for each tone of the plurality of tones;
   determining, at the base station, a timing difference between the pair of base stations based on a difference between the uplink slope value and the downlink slope value;
   computing, by the base station, a wideband uplink co-phasing value based on the per-tone uplink co-phasing values for each tone of the plurality of tones and the timing difference; and
   applying, by the base station, a phase correction value to communications by the plurality of base stations in the CoMP group, wherein the phase correction value is based on the timing difference and the difference between the wideband uplink co-phasing value and the wideband downlink co-phasing value.

2. The method of claim 1, wherein the computing the uplink slope value includes applying a successive maximum likelihood algorithm to the per-tone uplink co-phasing values for each tone of the plurality of tones over the whole spectrum band.

3. The method of claim 1, wherein the wideband downlink co-phasing value represents a first phase difference between the PSRS received at each of the one or more served UEs from the pair of base stations accumulated over the plurality of tones, and wherein the wideband uplink co-phasing value represents a second phase difference between the uplink PSRS as received by the pair of base stations of the plurality of base stations accumulated over the plurality of tones.

4. The method of claim 3, wherein the computing the wideband uplink co-phasing value includes:
   determining, by the base station, a first angle of the second phase difference between the uplink PSRS as received by the pair of base stations of the plurality of base stations, wherein the wideband downlink co-phasing value corresponds to a second angle identifying the first phase difference.

5. The method of claim 1, wherein the computing the wideband uplink co-phasing value includes:
   applying the timing difference to the per-tone uplink co-phasing values for each tone of the plurality of tones over the whole spectrum band to generate timing-adjusted per-tone uplink co-phasing values for each tone of the plurality of tones over the whole spectrum band; and
   computing the wideband uplink co-phasing value based on the timing-adjusted per-tone uplink co-phasing values.

6. The method of claim 1, wherein the downlink PSRS corresponds to a channel state information (CSI) reference signal (CSI-RS) and the uplink PSRS corresponds to a sounding reference signal (SRS).

7. A method of wireless communication, comprising:

transmitting, by a user equipment (UE), an uplink phase synchronization reference signal (PSRS) to one or more base stations, wherein the one or more base stations are part of a plurality of base stations in a coordinated multipoint (CoMP) group serving the UE;

receiving, at the UE, a downlink PSRS from each of the plurality of base stations in the CoMP group;

determining, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pair;

computing a downlink slope value for the whole spectrum band based on the downlink co-phasing values between each pair of the plurality of base stations over each tone of a plurality of tones of the whole spectrum band; and reporting, by the UE, the wideband downlink co-phasing value and the downlink slope value.

8. The method of claim 7, wherein the computing the downlink slope value includes applying a successive maximum likelihood algorithm to the downlink co-phasing values between each pair of the plurality of base stations over each tone of a plurality of tones of a whole spectrum band.

9. The method of claim 7, wherein the downlink co-phasing values between each pair represent a phase difference between the downlink PSRS from each of the pair.

10. The method of claim 9, wherein the determining includes:

computing, by the UE, a first angle of the phase difference between the downlink PSRS from each of the pair.

11. The method of claim 7, wherein the downlink PSRS corresponds to a channel state information (CSI) reference signal (CSI-RS) and the uplink PSRS corresponds to a sounding reference signal (SRS).

12. An apparatus configured for wireless communication, the apparatus comprising:

at least one processor; and a memory coupled to the at least one processor, wherein the at least one processor is configured:

to receive, at a base station of a plurality of base stations in a coordinated multipoint (CoMP) group serving one or more served user equipments (UEs), a feedback report from the one or more served UEs, wherein the feedback report includes:

a wideband downlink co-phasing value corresponding to an accumulation of downlink co-phasing values for each of a plurality of tones over a whole spectrum band based on a downlink phase synchronization reference signals (PSRS) received at each of the one or more served UEs from a pair of base stations of the plurality of base stations; and a downlink slope value for the whole spectrum band based on the downlink co-phasing values for each of the plurality of tones over the whole spectrum band;

to compute, at the base station, a per-tone uplink co-phasing value for each tone of the plurality of tones over the whole spectrum band based on an uplink PSRS as received by the pair of base stations;

to compute, at the base station, an uplink slope value for the whole spectrum band based on the computed per-tone uplink co-phasing values for each tone of the plurality of tones;

to determine, at the base station, a timing difference between the pair of base stations based on a difference between the uplink slope value and the downlink slope value;

to compute, by the base station, a wideband uplink co-phasing value based on the per-tone uplink co-phasing values for each tone of the plurality of tones and the timing difference; and to apply, by the base station, a phase correction value to communications by the plurality of base stations in the CoMP group, wherein the phase correction value is based on the timing difference and the difference between the wideband uplink co-phasing value and the wideband downlink co-phasing value.

13. The apparatus of claim 12, wherein the configuration of the at least one processor to compute the uplink slope value includes configuration of the at least one processor to apply a successive maximum likelihood algorithm to the per-tone uplink co-phasing values for each tone of the plurality of tones over the whole spectrum band.

14. The apparatus of claim 12, wherein the wideband downlink co-phasing value represents a first phase difference between the PSRS received at each of the one or more served UEs from the pair of base stations accumulated over the plurality of tones, and wherein the wideband uplink co-phasing value represents a second phase difference between the uplink PSRS as received by the pair of base stations of the plurality of base stations accumulated over the plurality of tones.

15. The apparatus of claim 14, wherein the configuration of the at least one processor to compute the wideband uplink co-phasing value includes configuration of the at least one processor to determine, by the base station, a first angle of the second phase difference between the uplink PSRS as received by the pair of base stations of the plurality of base stations, wherein the wideband downlink co-phasing value corresponds to a second angle identifying the first phase difference.

16. The apparatus of claim 12, wherein the configuration of the at least one processor to compute the wideband uplink co-phasing value includes configuration of the at least one processor:

to apply the timing difference to the per-tone uplink co-phasing values for each tone of the plurality of tones over the whole spectrum band to generate timing-adjusted per-tone uplink co-phasing values for each tone of the plurality of tones over the whole spectrum band; and to compute the wideband uplink co-phasing value based on the timing-adjusted per-tone uplink co-phasing values.

17. The apparatus of claim 12, wherein the downlink PSRS corresponds to a channel state information (CSI) reference signal (CSI-RS) and the uplink PSRS corresponds to a sounding reference signal (SRS).

18. An apparatus configured for wireless communication, the apparatus comprising:

at least one processor; and a memory coupled to the at least one processor, wherein the at least one processor is configured:

to transmit, by a user equipment (UE), an uplink phase synchronization reference signal (PSRS) to one or more base stations, wherein the one or more base stations are part of a plurality of base stations in a coordinated multipoint (CoMP) group serving the UE;

to receive, at the UE, a downlink PSRS from each of the plurality of base stations in the CoMP group;

to determine, by the UE, a wideband downlink co-phasing value corresponding to an accumulation of downlink co-phasing values between each pair of the plurality of base stations over each tone of a plurality of tones of a whole spectrum band, wherein the downlink co-phasing values are based on the downlink PSRS from each of the pair;

to compute a downlink slope value for the whole spectrum band based on the downlink co-phasing values between each pair of the plurality of base stations over each tone of a plurality of tones of the whole spectrum band; and to report, by the UE, the wideband downlink co-phasing value and the downlink slope value.

19. The apparatus of claim 18, wherein the configuration of the at least one processor to compute the downlink slope value includes configuration of the at least one processor to apply a successive maximum likelihood algorithm to the downlink co-phasing values between each pair of the plurality of base stations over each tone of a plurality of tones of a whole spectrum band.

20. The apparatus of claim 18, wherein the downlink co-phasing values between each pair represent a phase difference between the downlink PSRS from each of the pair.

21. The apparatus of claim 20, wherein the configuration of the at least one processor to determine includes configuration of the at least one processor to compute a first angle of the phase difference between the downlink PSRS from each of the pair.

22. The apparatus of claim 18, wherein the downlink PSRS corresponds to a channel state information (CSI) reference signal (CSI-RS) and the uplink PSRS corresponds to a sounding reference signal (SRS).

* * * * *